United States Patent
Choi

(10) Patent No.: US 11,496,903 B2
(45) Date of Patent: Nov. 8, 2022

(54) ELECTRONIC APPARATUS AND CONTROLLING METHOD THEREOF

(71) Applicant: Samsung Electronics Co., Ltd., Suwon-si (KR)

(72) Inventor: Daesung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 538 days.

(21) Appl. No.: 16/596,085

(22) Filed: Oct. 8, 2019

(65) Prior Publication Data
US 2020/0137579 A1    Apr. 30, 2020

(30) Foreign Application Priority Data
Oct. 26, 2018   (KR) .......................... 10-2018-0129302

(51) Int. Cl.
*H04W 12/12*   (2021.01)
*H04W 72/04*   (2009.01)
(Continued)

(52) U.S. Cl.
CPC .......... *H04W 12/122* (2021.01); *H04B 7/155* (2013.01); *H04W 72/0406* (2013.01); *H04W 84/12* (2013.01); *H04W 84/18* (2013.01)

(58) Field of Classification Search
CPC ......... H04L 29/06911; H04L 29/06925; H04L 29/06931; H04L 29/06938; G06F 21/55; H04B 7/155; H04W 12/122; H04W 12/1202; H04W 72/0406; H04W 84/12; H04W 84/18; H04W 80/04; H04W 8/26; H04W 88/06
(Continued)

(56) References Cited

U.S. PATENT DOCUMENTS 7,970,013 B2 *  6/2011  Sinha ................... H04L 63/1416
                                                              370/332
9,949,131 B2    4/2018  Ram et al.
(Continued)

FOREIGN PATENT DOCUMENTS

KR    10-1429178        8/2014
KR    101429178 B1 *    8/2014   ............ H04W 12/12
(Continued)

OTHER PUBLICATIONS

Korean Office Action for Korean Patent Application No. 10-2018-0129302 dated Nov. 11, 2021.
(Continued)

*Primary Examiner* — Pankaj Kumar
*Assistant Examiner* — Sanjay K Dewan
(74) *Attorney, Agent, or Firm* — Staas & Halsey LLP

(57) ABSTRACT

An electronic apparatus and control method thereof are provided. The electronic apparatus includes a sensor, a communicator, and a processor configured to, based on a wireless communication between a relay device and a terminal device being sensed by the sensor, identifies whether the relay device and the terminal device is an authorized device, and based on at least one of the relay device or the terminal device being identified as an unauthorized device, controls the communicator to transmit a beacon signal including communication channel transfer information to the terminal device.

15 Claims, 6 Drawing Sheets

(51) Int. Cl.
*H04B 7/155* (2006.01)
*H04W 12/122* (2021.01)
*H04W 84/18* (2009.01)
*H04W 84/12* (2009.01)

(58) Field of Classification Search
USPC .......................................... 726/23; 370/338
See application file for complete search history.

(56) References Cited

U.S. PATENT DOCUMENTS

| | | | | |
|---|---|---|---|---|
| 2007/0217371 | A1* | 9/2007 | Sinha | H04L 63/1441 370/338 |
| 2008/0062929 | A1* | 3/2008 | Leonidov | H04L 5/0053 370/331 |
| 2009/0016529 | A1* | 1/2009 | Gopinath | H04W 12/069 380/270 |
| 2009/0119741 | A1* | 5/2009 | Palnitkar | G06Q 30/0283 705/400 |
| 2010/0296496 | A1* | 11/2010 | Sinha | H04W 12/12 370/338 |
| 2012/0096539 | A1* | 4/2012 | Hu | H04L 63/1416 726/13 |
| 2014/0204850 | A1* | 7/2014 | Kim | H04L 5/0078 370/329 |
| 2015/0117425 | A1* | 4/2015 | Gupta | H04W 72/10 370/338 |
| 2016/0127988 | A1* | 5/2016 | Yao | H04W 48/18 370/338 |
| 2016/0232167 | A1* | 8/2016 | Ham | G06F 16/9537 |
| 2016/0255570 | A1* | 9/2016 | Fang | H04W 48/12 370/338 |
| 2017/0013004 | A1* | 1/2017 | Kim | H04L 63/1425 |
| 2017/0245152 | A1* | 8/2017 | Han | H04L 63/10 |
| 2018/0192458 | A1 | 7/2018 | Aminaka et al. | |
| 2018/0324200 | A1 | 11/2018 | Choi et al. | |
| 2019/0088112 | A1* | 3/2019 | Jung | E01F 15/003 |
| 2019/0200278 | A1* | 6/2019 | Ouzieli | H04W 12/106 |
| 2020/0107197 | A1* | 4/2020 | Kaushik | H04W 88/08 |

FOREIGN PATENT DOCUMENTS

| | | | |
|---|---|---|---|
| KR | 10-1447469 | 10/2014 | |
| KR | 101447469 B1 * | 10/2014 | ............ H04W 12/12 |
| KR | 20160072533 A * | 12/2014 | ............ H04L 12/26 |
| KR | 20170062301 A * | 11/2015 | ............ H04W 12/08 |
| KR | 10-1575341 | 12/2015 | |
| KR | 101575341 B1 * | 12/2015 | ............ H04W 24/00 |
| KR | 10-2016-0072533 | 6/2016 | |
| KR | 10-1737893 | 5/2017 | |
| KR | 101737893 B1 * | 5/2017 | ............ H04W 12/12 |
| KR | 10-2017-0062301 | 6/2017 | |
| WO | WO-2018193286 A1 * | 10/2018 | ............ H04W 4/00 |

OTHER PUBLICATIONS

International Search Report and Written Opinion of the International Searching Authority dated Jan. 31, 2020 in International Patent Application No. PCT/KR2019/013152.

* cited by examiner

FIG. 4

| Destination MAC | Source MAC | | | |
|---|---|---|---|---|
| Broadcast MAC | Spoofed AP MAC | | | |
| Element ID | Length | Channel Switch Mode | New Channel Number | Channel Switch Count |
| 0x25 | 0x03 | 0x00 | dynamic | 0x00 |

FIG. 5

| Destination MAC | Source MAC | | | |
|---|---|---|---|---|
| Specific station MAC | Spoofed AP MAC | | | |
| Element ID | Length | Channel Switch Mode | New Channel Number | Channel Switch Count |
| 0x25 | 0x03 | 0x00 | dynamic | 0x00 |

ELECTRONIC APPARATUS AND CONTROLLING METHOD THEREOF

CROSS-REFERENCE TO RELATED APPLICATIONS

This application is based on and claims priority from Korean Patent Application No. 10-2018-0129302, filed on Oct. 26, 2018 in the Korean Intellectual Property Office, the disclosure of which is incorporated herein by reference in its entirety.

BACKGROUND

1. Field

Apparatuses and methods consistent with exemplary embodiment of the present disclosure relate to an electronic apparatus which blocks a communication connection between a terminal device and a relay device through a wireless intrusion prevention system and a controlling method thereof.

2. Description of the Related Art

Due to the rapid development and distribution of the Internet, the network environment is becoming more complicated. However, various types of network attacks such as hacking on the Internet, system intrusion, acquiring the authority of system administrator, concealed intrusion, the attack of service denial, etc. expose the Internet to the risk of hacking and thus, the Internet security is increasingly compromised. Therefore, there is need for network security technologies such as antivirus, firewall, integrated security management, intrusion detection system, etc. to solve such Internet security problems.

A wireless LAN system for wireless Internet communication includes an access point (AP) and a terminal device. A commonly used AP only provides transmission and network support functions for wireless traffic and thus, it cannot filter hacking information that is invaded wirelessly. To solve this problem, Wireless Intrusion prevention System (WIPS) has been developed.

SUMMARY

The present disclosure is to provide a WIPS-based electronic apparatus which when at least one of AP and a terminal device is an unauthorized device, blocks a communication connection between the AP and the terminal device, and a controlling method thereof.

An electronic apparatus according to an embodiment of the disclosure includes a sensor, a communicator, and a processor configured to, based on a wireless communication between a relay device and a terminal device being sensed by the sensor, identify whether the relay device and the terminal device is an authorized device, and based on at least one of the relay device or the terminal device being identified as an unauthorized device, control the communicator to transmit a beacon signal including communication channel transfer information to the terminal device.

The processor may generate the beacon signal by including identification information of the relay device as source information.

The processor may include identification information of the relay device as the source information, and generate the beacon signal by including identification information of the terminal device as destination information.

The communication channel transfer information may include control information to control channel transfer and channel information including target channel information. The control information may include information for instructing a transfer from a first communication channel, and the target channel information may include information for transferring from the first communication channel to a second communication channel.

The processor, based on first identification information of the first communication channel through which the wireless communication between the relay device and the terminal device is performed being acquired by the sensor, may generate the beacon signal by including second identification information of the second communication channel which is different from the first communication channel in the target channel information.

The second communication channel may belong to a band which is different from the first communication channel.

When the terminal device accesses the second communication channel based on the second identification information, a communication which is performed through the first communication channel between the relay device and the terminal device may be blocked.

The wireless communication between the relay device and the terminal device may be performed according to a standard of IEEE 802.11w.

The electronic apparatus may be implemented as a Wireless Intrusion Prevention System (WIPS) device.

A controlling method of an electronic apparatus according to an embodiment includes, based on a wireless communication between a relay device and a terminal device being sensed by a sensor, identifying whether each of the relay device and the terminal device is an authorized device, and based on at least one of the relay device or the terminal device being identified as an unauthorized device, transmitting a beacon signal including communication channel transfer information to the terminal device.

The method may further include generating the beacon signal by including identification information of the relay device as source information.

The generating the beacon signal may include generating the beacon signal by including identification information of the terminal device as destination information.

The communication channel transfer information may include control information to control channel transfer and channel information including target channel information, the control information may include information for instructing a transfer from a first communication channel, and the target channel information may include target channel information for transferring from the first communication channel to a second communication channel.

The method may further include, based on first identification information of the first communication channel through which the wireless communication between the relay device and the terminal device is performed being acquired by the sensor, generating the beacon signal by including second identification information of the second communication channel which is different from the first communication channel in the target channel information.

The second communication channel may belong to a band which is different from the first communication channel.

When the terminal device accesses the second communication channel based on the second identification information, a communication which is being performed through the first communication channel between the relay device and the terminal device may be blocked.

The wireless communication between the relay device and the terminal device may be performed according to a standard of IEEE 802.11w.

The electronic apparatus may be implemented as a Wireless Intrusion Prevention System (WIPS) device.

A non-transitory computer readable recording medium storing a computer instruction to perform an operation of an electronic apparatus when executed by a processor according to an embodiment may include, based on wireless communication between a relay device and a terminal device being sensed by the sensor, identifying whether each of the relay device and the terminal device is an authorized device, and based on at least one of the relay device or the terminal device being identified as an unauthorized device, transmitting a beacon signal including communication channel transfer information to the terminal device.

According to the above-described various embodiments, even in a network environment where IEEE 802.11w is applied, a communication connection between a relay device and a terminal device can be blocked.

In addition, as a communication connection between a relay device and a terminal device is blocked using a beacon signal, there is the effect of reducing the load of the electronic apparatus.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 4 is a view provided to explain configuration of a beacon frame which is broadcast according to an embodiment;

FIG. 5 is a view provided to explain configuration of a beacon frame which is unicast according to an embodiment.

DETAILED DESCRIPTION OF EXEMPLARY EMBODIMENTS

Figure 1:
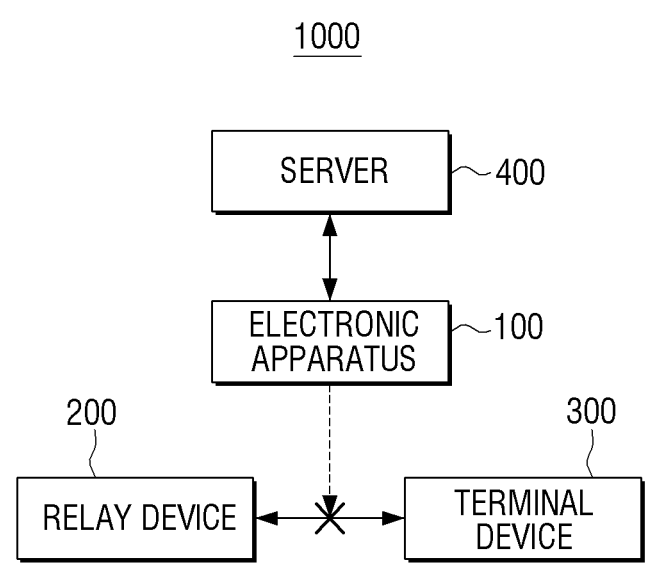
FIG. 1 is a view illustrating an electronic system according to an embodiment.

Hereinafter, the present disclosure will be described in detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the description, the term "at least one of A or/and B" may include all possible combinations of the items that are enumerated together. For example, the term "at least one of A or/and B" means (1) including at least one A, (2) including at least one B, or (3) including both at least one A and at least one B.

The term such as "first" and "second" used in various exemplary embodiments may corresponding various elements regardless of an order and/or importance of the corresponding elements, and does not limit the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element).

In the present disclosure, a 'module' or a 'unit' performs at least one function or operation and may be implemented by hardware or software or a combination of the hardware and the software. In addition, a plurality of 'modules' or a plurality of 'units' may be integrated into at least one processor (not illustrated) except for 'modules' or 'units' that should be realized in a specific hardware. Also, the term "user" may refer to a person who uses an electronic apparatus or an apparatus (e.g., an artificial intelligence (AI) electronic apparatus) that uses the electronic apparatus.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

Hereinafter, exemplary embodiments will be described in greater detail with reference to the accompanying drawings.

FIG. 1 is a view illustrating an electronic system according to an embodiment.

An electronic system 1000 comprises an electronic apparatus 100, a relay device 200, a terminal device 300, and a server 400.

According to an embodiment, the electronic apparatus 100 is an apparatus capable of blocking a communication connection between the relay device 200 and the terminal device 300, and may be implemented as a Wireless Intrusion Prevention System (WIPS). However, the electronic apparatus 100 is not limited thereto, and may be implemented in various forms as long as it could block a communication connection of an unauthorized device. Here, the WIPS is a system for detecting and responding to security threats in a wireless LAN environment. Specifically, the WIPS is a system for periodically monitoring the relay device 200 and the terminal device 300 to prevent unauthorized access to the relay device 200 or the terminal device 300 or to block a communication connection. The WIPS may be referred to as a wireless firewall, webs, a wireless network security solution, etc., but hereinafter, will be referred to as the WIPS for convenience of explanation.

The relay device 200 is a device which allows the terminal device 300 to access a network. The relay device 200 may be referred to as an Access Point (AP), and may be connected to a router to relay data between the terminal device 300 and a device on a network.

The terminal device 300 is a device capable of being connected to a network through a communication connection and provides an Internet service to a user. The terminal device 300 may be implemented as a smartphone, a tablet PC, a mobile phone, a desktop PC, a laptop PC, a netbook computer, a PDA, a portable multimedia player (PMP), an MP3 player, a camera, a wearable device, or the like.

The server 400 is configured to transmit and receive data with the electronic apparatus 100. For example, the server 400 may transmit information regarding an unauthorized relay device or an unauthorized terminal device to the electronic apparatus 100 or receive information obtained from the electronic apparatus 100. The server 400 may be implemented as a WIPS-based server.

Meanwhile, if a wireless communication between the relay device 200 and the terminal device 300 is connected, and at least one of the relay device 200 or the terminal device is an unauthorized device, it is necessary to block the wireless communication connection between the relay device 200 and the terminal device 300 for network security, of which various embodiments will be described in detail with accompanying drawings.

Figure 2:
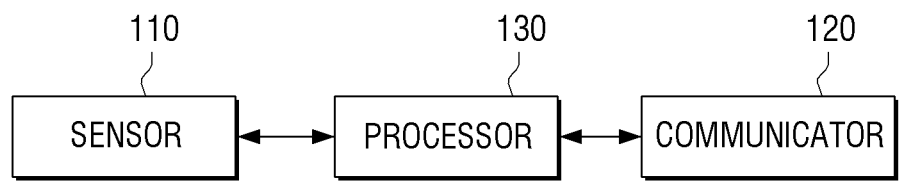
FIG. 2 is a block diagram provided to explain an operation of an electronic apparatus according to an embodiment.

FIG. 2 is a block diagram provided to explain an operation of an electronic apparatus according to an embodiment.

Referring to FIG. 2, the electronic apparatus 100 comprises a sensor 110, a communicator 120 and a processor 130.

The sensor 110 is configured to monitor a wireless frame. The sensor 110 may acquire the MAC address of the relay device 200 and the terminal device 300, security settings, frame appearance frequency, transmission rate, data size, SSID, communication channel, RSSI, etc. of the relay device 200 and the terminal device 300 based on the monitored wireless frame. Here, the wireless frame means a unit of a wireless signal.

In particular, the sensor 110 may monitor 2.4 Ghz and 5 Ghz bands used in the wireless network to which IEEE 802.11 standard is applied. Accordingly, the sensor 110 may sense whether a communication connection between the relay device 200 and the terminal device 300 is established. The information obtained from the sensor 110 may be transmitted to the server 400 under the control of the processor 130.

Meanwhile, the sensor 110 may be implemented as a WIPS sensor, but is not limited thereto. The sensor 110 may be implemented in various forms as long as it may monitor a wireless frame.

The communicator 120 is configured to transmit signal to the relay device 200 and the terminal device 300. For example, the communicator 120 may transmit a signal to outside according to a wireless communication method such as BlueTooth (BT), Wireless Fidelity (WI-FI), Zigbee, Infrared (IR), Serial Interface, Universal Serial Bus (USB), Near Field Communication (NFC). Vehicle to Everything (V2X), Cellular, or the like. The communicator 120 may be implemented by hardware, software or a combination of the hardware and the software. For example, the communicator 120 may comprise circuitry.

In addition, the communicator 120 may unicast a signal to a specific device or broadcast a signal to all devices under the control of the processor 130.

In particular, the communicator 120 may transmit a beacon signal to outside based on a Bluetooth communication method, but is not limited thereto. The communicator 120 may externally radiate a beacon signal according to various communication methods.

The processor 130 controls the overall operations of the electronic apparatus 200.

According to an embodiment, the processor 130 may be implemented as a digital signal processor (DSP) for processing digital signals, a microprocessor, or a Time controller (TCON), but is not limited thereto. The processor 130 may include at least one of a central processing unit (CPU), a Micro Controller Unit (MCU), a micro processing unit (MPU), a controller, an application processor (AP), or communicator processor (CP), or ARM processor, or may be defined as the corresponding term. In addition, the processor 130 may be implemented as a System on Chip (SoC) or large scale integration (LSI) in which a processing algorithm is embedded, or may be implemented in the form of a Field Programmable gate array (FPGA). The processor 130 may perform various functions by executing computer executable instructions stored in a storage (not illustrated).

According to an embodiment, when wireless communication between the relay device 200 and the terminal device 300 is sensed by the sensor 110, the processor 130 may identify whether each of the relay device 200 and the terminal device 300 is an authorized device.

Specifically, the processor 130 may identify whether each of the relay device 200 and the terminal device 300 is an authorized device based on the information obtained from the sensor 110. For example, the processor 130 may identify whether each of the relay device 200 and the terminal device 300 is an authorized device based on the information such as the MAC address of the relay device 200 and the terminal device 300, security settings, frame appearance frequency, transmission rate, data size, SSID, communication channel, RSSI, or the like. For example, the processor 130 may compare identification information of the device stored in the storage (not illustrated) with identification information of the relay device 200 and the terminal device 300 obtained from the sensor 110 to identify whether the relay device 200 and the terminal device 300 are authorized devices. For example, the MAC address of the access point used in the company and the MAC address information of the portable terminals of the employees may be stored in the storage. If the MAC of the access point or the MAC address information of the terminal device obtained from the sensor 110 is compared with the MAC address information stored in the storage and they are not consistent with each other, the processor 130 may identify that the corresponding device is an unauthorized device.

Alternatively, the processor 130 may identify whether the relay device 200 and the terminal device 300 are unauthorized devices using a Market Packet Test method, an Open AP Test method, a MAC Adjacency Test method, etc. Here, the Market Packet Test method is a technology where the processor 130 transmits a signal having a unique identifier to a device to be tested via a wired network, and if the device to be tested broadcasts the corresponding signal wirelessly, the electronic apparatus 100 compares the MAC address having the unique identifier with the MAC address of an authorized device to identify whether the corresponding device is an unauthorized device. The Open AP Test method is a technology where the processor 130 allows a device to be tested to be wirelessly connected to the electronic apparatus 100, transmits a signal to a server connected to the corresponding device via a wired network by using the identification information of the device to be tested, and identifies whether the corresponding device is an unauthorized device according to whether the corresponding signal is transmitted to the server. The MAC Adjacency Test method is a technology where the wired MAC address of the device to be tested is compared with the wireless MAC address to identify an unauthorized device. The above-described technology is a known technology and thus, detailed description thereof will be omitted.

According to another embodiment, the processor 130 may transmit information such as the MAC address of the relay device 200 and the terminal device 300 obtained from the sensor 110, security settings, frame appearance frequency, transmission rate, data size, SSID, communication channel, RSSI, etc. to the external server 400, and the external server 400 may identify whether each of the relay device 200 and the terminal device 300 is an authorized device. In this case, the processor 130 may receive information regarding authorization of each of the relay device 200 and the terminal device 300 from the external server 400 and identify whether they are authorized devices.

The processor 130 may identify whether the relay device 200 and the terminal device 300 are unauthorized devices in various methods in addition to the above-described methods.

If it is identified that at least one of the relay device 200 or the terminal device 300 is an unauthorized device, the processor 130 may control the communicator 120 to transmit a signal including communication channel transfer information to the terminal device 300. Specifically, the processor 130 may generate and transmit a beacon signal including communication channel transfer information. Here, the beacon signal is a signal having a specific frequency and is transmitted at a predetermined period. Meanwhile, the processor 130 may transmit a beacon signal in units of beacon frames.

The processor 130 may generate a beacon signal by including the identification information of the relay device 200 as source information. Here, the identification information may include information that may indicate the ID of the corresponding device such as a MAC address. The source information is information indicating the source of the corresponding signal. In other words, the source signal may represent the caller information of the corresponding signal. The processor 130 may include the identification information of the relay device 200 in the caller information of the beacon signal transmitted by the processor 130 and thus, may forge as if the relay device 200 transmits the corresponding beacon signal. Accordingly, the terminal device 300 may identify that the beacon signal is transmitted from the relay device 200 and perform an operation corresponding to the information included in the beacon signal.

Meanwhile, the processor 130 may block a communication connection between the relay device 200 and the terminal device 300 by transmitting a beacon signal including communication channel transfer information. Here, the communication channel transfer information may include control information for controlling channel transfer and channel information including target channel information. Here, the control information may include information for instructing the transfer of the communication channel, and the target channel information may include target channel information for transferring the communication channel. In other words, the control information may include information regarding whether to transfer the communication channel, and the target channel information may include information regarding the communication channel to move. The communication channel transfer information may be implemented as a Channel Switch Announcement (CSA) field.

Once the first identification information of the first communication channel where the wireless communication between the relay device 200 and the terminal device 300 is performed is obtained by the sensor 110, the processor 130 may generate a beacon signal by including the second identification information of the second communication channel which is different from the first communication channel in the target channel information. Here, the identification information of the communication channel may include the band information, channel number information, etc. of the communication channel.

For instance, suppose a case where a communication connection between the relay device 200 and the terminal device 300 is established in the Channel No. 1. The processor 130 may obtain the identification information (Channel No. 1) of the communication channel connected between the relay device 200 and the terminal device 300 by the sensor 110. Subsequently, the processor 130 may generate a beacon signal by including the identification information of Channel No. 2 which is different from Channel No. 1 in the target channel information. In addition, as the source information of the beacon signal includes the identification information of the relay device 00, the terminal device 300 may misunderstand that the beacon signal is transmitted from the relay device 200, block the communication connection from Channel No. 1 which is currently in communication based on the communication channel transfer information included in the received beacon signal, move to Channel No. 2, and try to establish a communication connection with the relay device 200. Although the relay device 200 tries to establish a communication connection with the terminal device 300 in Channel No. 1 in order to restore the communication connection with the terminal device 300 which has been cut off, the terminal device 300 has been moved to Channel No. 2 and thus, the communication connection between the replay device 200 and the terminal device 300 may be blocked.

In other words, as the terminal device 300 accesses the second communication channel based on the second identification information, the communication performed through the first communication channel between the relay device 200 and the terminal device 300 may be blocked.

According to an embodiment, the second communication channel may be a channel which belongs to a different band from the band of the first communication channel. In other words, the processor 130 may generate a beacon signal by including the identification information of the second channel which belongs to a band different from the band of the first communication channel where wireless communication between the relay device 200 and the terminal device 300 is performed, in the target channel information.

For instance, if the first communication channel where communication between the relay device 200 and the terminal device 300 is performed is Channel No. 1 of 2.4 Ghz, the processor 130 may generate a beacon signal by including the communication channel which belongs to a band different from the band of 2.4 Ghz, for example, the channel information of Channel No. 36 of 5 Ghz in the target channel information. Subsequently, the terminal device 300 may identify the received beacon signal as a signal transmitted from the relay device 200. The terminal device 300 may terminate the communication connection from Channel No. 1 of 2.4 Ghz which is currently in communication, and perform communication with the relay device 200 by moving to Channel No. 36 of 5 Ghz based on the beacon signal.

As such, when a communication channel is moved between bands based on a beacon signal transmitted from the electronic apparatus 100, reconnection between the relay device 200 and the terminal device of which communication connection has been cut off may be relatively more difficult.

Meanwhile, the processor 130 may generate a beacon signal by including the identification information of the relay device 200 as source information and including the identification information of the terminal device 300 as the destination information of the beacon signal. Here, the destination information may be receiver information where the beacon signal is reached.

For instance, if it is identified that a specific terminal device is an unauthorized device, the processor 130 may transmit a beacons signal to the corresponding terminal device by including the MAC address of the unauthorized terminal device as destination information. In other words, the processor unicasts the beacon signal which is generated by including the identification information of the unauthorized terminal device as destination information to the corresponding terminal device and thus, the communication connection between the corresponding terminal device and the relay device 200 can be blocked.

Alternatively, the processor 130 may not include the identification information of a specific terminal device in destination information. For example, if FF:FF:FF:FF:FF:FF is designated as the destination information of the beacon signal, the processor 130 may transmit the beacon signal to all terminal devices. In other words, the processor 130 may broadcast the beacon signal so that the communication connection of all devices connected to the relay device 200 may be blocked.

For example, if the relay device 200 is an unauthorized device, such a beacon signal may be broadcast in order to block the communication connection of all terminal devices 300 connected to the unauthorized relay device 200. Alternatively, if all terminal devices 300 connected to the authorized relay device 200 are unauthorized devices, a beacon signal may be broadcast in order to block the communication connection of all of the unauthorized terminal devices 300 connected to the authorized relay device 200.

Meanwhile, the wireless communication according to an embodiment may be communication which is performed according to IEEE 802.11 standard. In particular, the wireless communication between the relay device 200 and the terminal device 300 may be communication which is performed according to IEEE 802.11w standard. Here, IEEE 802.11w is a standard modified from IEEE 802.11 to improve security of the management frame. However, the present disclosure is not limited thereto, and an embodiment of the present disclosure may be applied to wireless communication where various standards are applied.

Meanwhile, the load of the electronic apparatus 100 may be reduced by using a beacon signal as a transmission signal. Conventionally, the electronic apparatus 100 cuts off a communication connection with the relay device 200 by transmitting a separate signal from each terminal device 30, but in the case of broadcasting a beacon signal according to an embodiment of the present disclosure, there is no need to transmit and receive a separate signal with respect to each terminal device 300 and thus, the load of the electronic apparatus 100 may be reduced.

Meanwhile, the electronic apparatus 100 according to an embodiment may be implemented as a Wireless Intrusion Prevention System (WIPS) device, but it is not limited thereto. The electronic apparatus 100 may be implemented in various forms as long as it may block a communication connection of an unauthorized device.

Meanwhile, it is described that the electronic apparatus 100 cuts off communication between the relay device 200 and the terminal device 300 that are wirelessly connected. However, in some cases, the electronic apparatus 100 may block a communication connection between the relay device 200 and the terminal device 300 in advance.

Figure 3:
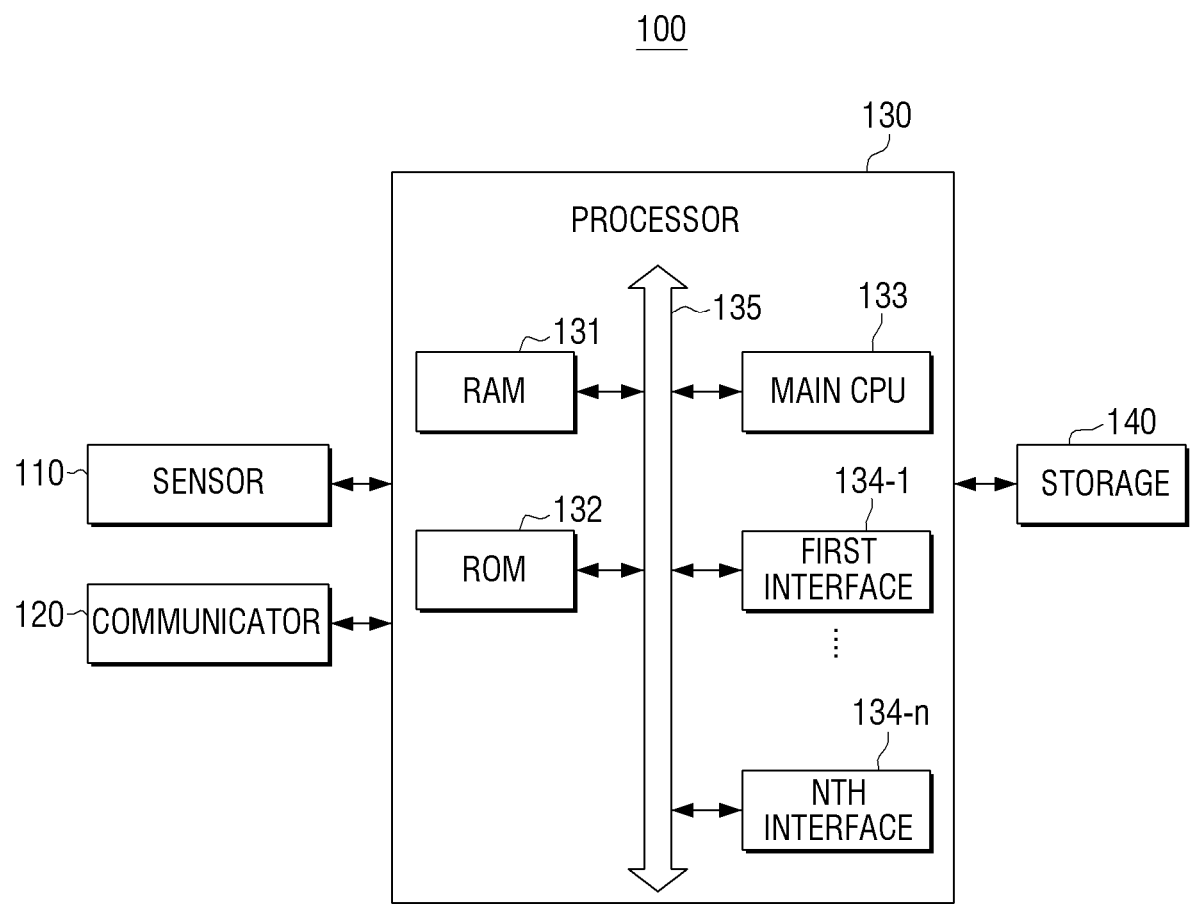
FIG. 3 is a block diagram provided to explain detailed configuration of an electronic apparatus 100.

FIG. 3 is a block diagram provided to explain detailed configuration of the electronic apparatus 100.

Referring to FIG. 3, the electronic apparatus 100 comprises the sensor 110, the communicator 120, the processor, and a storage 140. In FIG. 3, the detailed description of the parts overlapping with those illustrated in FIG. 2 will be omitted.

The processor 130 controls the overall operations of the electronic apparatus 100 using various programs stored in the storage 140.

Specifically, the processor 130 includes a RAM 131, a ROM 132, a main CPU 133, first to nth interfaces 134-1~134-n, and a bus 135.

The RAM 131, the ROM 132, the main CPU 133, the first to nth interfaces 134-1~134-n, etc. may be connected with one another through the bus 135.

The ROM 132 stores a set of instructions, etc. for system booting. When a turn-on instruction is input and power is supplied, the main CPU 133 copies the O/S stored in the storage 140 in the RAM 131 according to the instruction stored in the ROM 132, and boots the system by executing the O/S. When booting is completed, the main CPU 133 copies various types of application programs stored in the storage 140 in the RAM 131, and performs various operations by executing the application programs copied in the RAM 131.

The main CPU 133 accesses the storage 140, and performs booting by using the O/S stored in the storage 140. Also, the main CPU 133 performs various operations by using various programs, contents, data, etc. stored in the storage 140.

The first to nth interfaces 134-1 to 134-n are connected with the aforementioned various components. One of the interfaces may be a network interface connected with an external device through a network.

The storage 140 may store information such as the MAC address of the relay device 200 and the terminal device 300 obtained by the sensor 110, communication channel information, security settings, frame appearance frequency, transmission rate, data size, SSID, communication channel, RSSI, etc.

In addition, the storage 140 may store the identification information of the relay device 200 and the terminal device 300 which are identified as authorized. For instance, the storage 140 may store the MAC address of the access point used in the company and the MAC address information of the portable terminal.

The storage 140 may be implemented as an internal memory such as a ROM (e.g., an electrically erasable programmable read-only memory (EEPROM)), a RAM or the like, included in the processor 130, or be implemented as a memory separate from the processor 120. In this case, the storage 140 may be implemented in the form of a memory embedded in the electronic apparatus 100, or in the form of a memory datachable from the electronic apparatus 100 depending on the purpose of data storage. For instance, in the case of data for driving the electronic apparatus 100, the data may be stored in a memory embedded in the electronic apparatus 100, and in the case of data for the extended function of the electronic apparatus 100, the data may be stored in a memory which can be detached from the electronic apparatus 100. Meanwhile, when a memory is embedded in the electronic apparatus 100, the memory may be implemented as at least one of a volatile memory (e.g., dynamic RAM (DRAM), static RAM (SRAM), or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash), a hard disk drive (HDD) or a solid state drive (SSD). When a memory is removably attached to the electronic apparatus 100, the memory may be implemented as a memory card (e.g., a compact flash (CF)), a secure digital (SD), a micro secure digital (Micro-SD), a mini secure digital (Mini-SD), an extreme digital (xD), a multi-media card (MMC)), an external memory connectable to a universal serial bus (USB) port (e.g., USB memory) or the like.

FIG. 4 is a view provided to explain configuration of a beacon frame which is broadcast according to an embodiment.

FIG. 4 illustrates an example of a beacon frame in a case where the electronic apparatus 100 broadcasts a beacon signal without any predetermined destination information.

The electronic apparatus 100 may broadcast a beacon frame as illustrated in FIG. 4 in order to cut off a communication connection of all the terminal devices 300 connected to the relay device 200. For example, if the relay device 200 is an unauthorized device, an embodiment in which a beacon frame is broadcast to block a communication connection of all the terminal devices 300 connected to the unauthorized relay device 200 may be used. Alternatively, if the all the terminal devices 300 connected to the relay device 200 are unauthorized devices, an embodiment in which a beacon frame is broadcast to block the communication connection of all the unauthorized terminal devise 300 connected to the authorized relay device 200 may be used.

Here, the Destination MAC means the destination information of a beacon signal. In general, the Destination MAC may include the MAC address of the terminal device 300 to which the beacon signal is to be transmitted. However, since in FIG. 4, it is assumed that a beacon frame is broadcast, the MAC address of a specific terminal device may not be included and instead, the Broadcast MAC indicating broadcast may be included. For instance, the Destination MAC may be assigned FF:FF:FF:FF:FF:FF indicating broadcast.

The Source MAC means source information, in other words, caller information. In general, the Source MAC may include the MAC address of the relay device 200 which transmits the beacon signal. The terminal device 300 may identify the sender of the corresponding frame based on the Source MAC included in the beacon frame.

According to an embodiment, the electronic apparatus 100 may include the MAC address of the relay device 200 which is in communication with the terminal device 300 in the Source MAC and transmit a beacon frame. In other words, the electronic apparatus 100 may forge as if the relay device 300 transmits the corresponding beacon frame. In this case, the terminal device 300 which receives the beacon frame may misunderstand that the corresponding beacon frame is transmitted from the relay device 200 which is in communication with the terminal device 300.

Length is information indicating the length of a frame. As illustrated in FIG. 4, if the length is 03, this may indicate that 3 bytes of information are included.

Channel Switch Mode is information indicating whether a communication channel moves. The channel switch mode may include 0 or 1. If the channel switch mode is shown as 0, it indicates that the communication channel may not be moved, and when it is shown as 1, it indicates that the communication channel may be moved. In other words, the channel switch mode may be information corresponding to the control information indicating the transfer of the communication channel described above.

New Channel Number may indicate identification information of a communication channel to which a terminal device is to be moved. For example, if the new channel number is 1, it indicates that the channel the terminal device is to be moved to is channel No. 1. In general, channel Nos. 1 to 13 may be included in the 2.4 GHz band, and channel Nos. 36 to 165 may be included in the 5 Ghz band. In other words, the new channel number may include band information.

The electronic apparatus 100 may obtain a communication connection channel between the relay device 200 and the terminal device 300, and assign a different channel to the new channel number in order to block a communication connection between the relay device 200 and the terminal device 300. Since it has been described above, a detailed description thereof will be omitted.

Channel Switch Count is information indicating how many times a frame including communication channel transfer information is transmitted in order to move to the communication channel included in the new channel number in case the frame is transmitted multiple times. For example, if the channel switch count is 4, the terminal device 300 may move to the communication channel included in the new channel number when a beacon frame including communication channel transfer information is received four times.

FIG. 5 is a view provided to explain configuration of a beacon frame which is unicast according to an embodiment.

FIG. 5 is an example of a beacon frame including predetermined destination information.

The electronic apparatus 100 may unicast a beacon frame as illustrated in FIG. 5 in order to block a communication connection of the specific terminal device 300 connected to the relay device 200. For instance, an embodiment in which if the specific terminal device 300 is unauthorized, a beacon frame may be unicast in order to block a communication connection between the corresponding terminal device 300 and the relay device 200 may be used.

Specifically, the electronic apparatus 100 may broadcast a beacon frame by including the MAC address of the specific terminal device 300 in the Destination MAC. In this case, only the terminal device 300 corresponding to the corresponding MAC address may receive the unicast beacon frame, and the communication connection with the relay device 200 which is in communication may be cut off based on the received beacon frame. If there is another terminal device 300, the Destination MAC information included in the beacon frame may be checked and the terminal device 300 can be ignored. Accordingly, the communication connection between the authorized terminal device 300 and the relay device 200 can be maintained.

The Source MAC, Length, Channel Switch Mode, New Channel Number, and Channel Switch Count are overlapped with those in FIG. 4 and thus, a detailed description thereof will be omitted.

Figure 6:
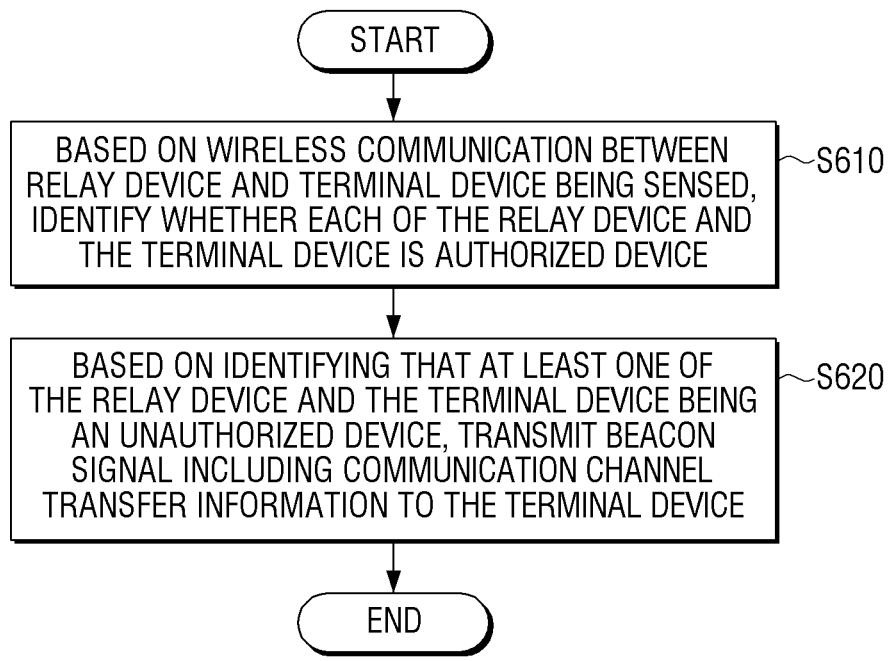
FIG. 6 is a flowchart provided to explain a controlling method of an electronic apparatus according to an embodiment.

FIG. 6 is a flowchart provided to explain a controlling method of an electronic apparatus according to an embodiment.

If wireless communication between the relay device 200 and the terminal device 300 is sensed, the electronic apparatus 100 identifies whether each of the relay device and the terminal device is authorized (S610).

For example, the electronic apparatus 100 may obtain information regarding the MAC address of the relay device 200 and the terminal device 300, security settings, frame appearance frequency, transmission rate, data size, SSID, communication channel, RSSI, or the like, and identify whether each of the relay device 200 and the terminal device 300 is an authorized device based on the obtained information. For instance, the electronic apparatus 100 may compare the identification information of the device which is stored as an authorized device with the identification information of the relay device 200 and the terminal device 300 to identify an unauthorized device. For example, the MAC address information of an access point used in the company or the MAC address information of a portable device of an employee may be stored in the electronic apparatus 100. The electronic apparatus 100 compares the obtained MAC address of the access point or the MAC address information of the terminal device with the stored MAC address information and if they are not consistent, may identify that the corresponding device is an unauthorized device.

Alternatively, the electronic apparatus 100 may identify whether the relay device 200 and the terminal device 300 is an unauthorized device through a Market Packet Test method, an Option AP Test method, an MAC Adjacency Test method, etc.

According to another embodiment, the electronic apparatus 100 may identify devices by receiving information regarding authorization of each of the relay device 200 and the terminal device 300 from the server 400.

If it is identified that at least one of the relay device 200 or the terminal device 300 is an unauthorized device, the electronic apparatus 100 may transmit a beacon signal including communication channel transfer information to the terminal device 300 (S620).

Specifically, the electronic apparatus 100 may generate a beacon signal by including the identification information of the relay device 200 as source information. In case the electronic apparatus 100 transmits a beacon signal to the specific terminal device 300, the electronic apparatus 100 may generate a beacon signal by including the identification information of the corresponding terminal device 300 as destination information, and may unicast the generated beacon signal. In addition, in case the electronic apparatus 100 transmits a beacon signal to all terminal devices 300, the electronic apparatus 100 may generate a beacon signal by including FF:FF:FF:FF:FF:FF as destination information, and may broadcast the generated beacon signal.

Here, the communication channel transfer information may include control information to control channel transfer and channel information including target channel information. The control information may include information for instructing transfer of the communication channel, and the target channel information may include target channel information for transferring the communication channel. In other words, the control information may include information regarding whether to move the communication channel, and the target channel information may include information regarding the communication channel to move to. The communication channel transfer information may be implemented as Channel Switch Announcement (CSA).

Once the first identification information of the first communication channel where the wireless communication between the relay device 200 and the terminal device 300 is performed is obtained, the electronic apparatus 100 may generate a beacon signal by including the second identification information of the second communication channel which is different from the first communication channel in the target channel information. Here, the second communication channel may be a channel which belongs to a band different from the band of the first communication channel. For instance, if the first communication channel belongs to 2.4 GHz band, and the second communication channel may belong to 5 Ghz band.

As the terminal device 300 accesses the second communication channel based on the second identification information, the communication which is performed between the relay device 200 and the terminal device 300 through the first communication channel can be cut off.

Meanwhile, the wireless communication of an embodiment may be communication which is performed according to IEEE 802.11 standard. In particular, the wireless communication between the relay device 200 and the terminal device 300 may be communication which is performed according to IEEE 802.11w standard. Here, the IEEE 802.11w is a standard modified from IEEE 802.11 to improve security of the management frame. However, the present disclosure is not limited thereto, and an embodiment of the present disclosure may be applied to wireless communication where various standards are applied.

Meanwhile, the electronic apparatus 100 may be implemented as a Wireless Intrusion Prevention System (WIPS) device, but is not limited thereto.

The detailed operation of each step has been described above and thus, further descriptions will be omitted.

Meanwhile, at least some components of the above-described methods according to various embodiments of the present disclosure may be installed in the existing electronic apparatus, and may be implemented in the form of an application that is software which a user directly uses on an OS.

In addition, at least some components of the above-described methods according to various embodiments of the present disclosure may be implemented by only a software upgrade or a hardware upgrade of the existing electronic apparatus.

In addition, the above-described various embodiments of the present disclosure may be performed through an embedded server included in the electronic apparatus, or at least one external server of the electronic apparatus and the display device.

Meanwhile, according to an embodiment, the above-described various embodiments may be implemented as software including one or more instructions stored in a storage medium which can be read by machine (e.g., a computer). For instance, the machine may call at least one instruction from among the stored one or more instructions from the storage medium and perform an operation according to the instruction, and may include an electronic apparatus according to embodiments. When the instruction is executed under the control of the processor, the processor directly or using other components under the control of the processor may perform a function corresponding to the instruction. The one or more instructions may include a code generated by a complier or a code that may be executed by an interpreter. The storage medium which can be read by machine may be provided in the form of a non-transitory storage medium. Here, 'non-transitory' merely means that the storage medium is a tangible device and does not include a signal, and this term is not used to distinguish a case where data is stored in the storage medium semi-permanently and a case where data is stored temporarily.

According to an embodiment, a method according to the various embodiments may be included in a computer program product and provided therein. The computer program product can be traded between a seller and a buyer as a product. The computer program product may be distributed in the form of a storage medium that can be read by machine (e.g., compact disc read only memory (CD-ROM), or may be distributed online (e.g., downloaded or uploaded) through an application store (e.g., PlayStore™) or directly between two user devices. In the case of online distribution, at least a portion of the computer program product may be at least temporarily stored in a storage medium such as a memory of a server of a manufacturer, a server of an application store, or a relay server, or may be temporarily generated.

In addition, according to one embodiment, various embodiments described above may be read by a computer or a similar device using software, hardware, or a combination thereof. It can be implemented in a recording medium. In some cases, the embodiments described herein may be implemented by the processor itself. According to the software implementation, embodiments such as the procedures and functions described herein may be implemented as separate software modules. Each of the software modules may perform one or more functions and operations described herein.

Meanwhile, the computer instructions to perform processing operations of a device according to the above-described various embodiments may be stored in a non-transitory computer-readable medium. The computer instructions stored in the non-transitory computer readable medium allow the specific device to perform processing operations in the device according to the above-described various embodiments when executed by the processor of the specific device. Here, the operations may include, when the wireless communication between the relay device 200 and the terminal device 300 is sensed, identifying whether each of the relay device 200 and the terminal device 300 is an authorized device and the relay device 200 and if at least one of the terminal device 300 is identified as an unauthorized device, transmitting a beacon signal including communication channel transfer information to the terminal device 300.

A non-transitory computer readable medium refers to a medium that stores data semi-permanently rather than a medium storing data for a short time such as a register, a cache, a memory, and the like, and can be read by a device. Specific examples of non-transitory computer readable media may include CD, DVD, hard disk, Blu-ray disk, USB, memory card, ROM, and the like.

According to an embodiment, a method according to the various embodiments may be included in a computer program product and provided therein. The computer program product can be traded between a seller and a buyer as a product. The computer program product may be distributed in the form of a storage medium that can be read by machine (e.g., compact disc read only memory (CD-ROM), or may be distributed online (e.g., downloaded or uploaded) through an application store (e.g., PlayStore™, AppStore™) or directly between two user devices. In the case of online distribution, at least a portion of the computer program product may be at least temporarily stored in a storage medium such as a memory of a server of a manufacturer, a server of an application store, or a relay server, or may be temporarily generated.

The respective components (e.g., module or program) according to the various example embodiments may include a single entity or a plurality of entities, and some of the corresponding sub-components described above may be omitted, or another sub-component may be further added to the various example embodiments. Alternatively or additionally, some components (e.g., module or program) may be combined to form a single entity which performs the same or similar functions as the corresponding elements before being combined. Operations performed by a module, a program, or other component, according to various exemplary embodiments, may be sequential, parallel, or both, executed iteratively or heuristically, or at least some operations may be performed in a different order, omitted, or other operations may be added.

The foregoing example embodiments and advantages are merely exemplary and are not to be construed as limiting the present disclosure. The present teaching may be readily applied to other types of devices. Also, the description of the example embodiments of the present disclosure is intended to be illustrative, and not to limit the scope of the claims, and many alternatives, modifications, and variations will be apparent to those skilled in the art.

What is claimed is:

1. An electronic apparatus comprising:
a sensor;
a communicator; and
a processor configured to:
based on a wireless communication between a relay device and at least one terminal device being sensed by the sensor, identify whether the relay device and the at least one terminal device is an authorized device,
generate a beacon signal by including identification information of the relay device as source information, the beacon signal being generated by including identification information of the at least one terminal device as destination information based on the at least one terminal device being identified as an unauthorized device,
based on the at least one terminal device being identified as an unauthorized device, control the communicator to transmit the beacon signal including communication channel transfer information to the at least one terminal device,
based on the relay device being identified as an unauthorized device, broadcast the beacon signal including communication channel transfer information,
wherein the identification information of each of the relay device and the at least one terminal device includes at least one of the MAC address information of each of the relay device and the at least one terminal device, security settings information, frame appearance frequency information, transmission rate information, data size information, communication channel information and RSSI (Received Signal Strength Indicator) information.

2. The electronic apparatus as claimed in claim 1, wherein the communication channel transfer information includes control information to control channel transfer and channel information including target channel information, wherein the control information includes information for instructing a transfer from a first communication channel, and wherein the target channel information includes information for transferring from the first communication channel to a second communication channel.

3. The electronic apparatus as claimed in claim 2, wherein the processor is configured to, based on first identification information of the first communication channel through which the wireless communication between the relay device and the at least one terminal device is performed being acquired by the sensor, generate the beacon signal by including second identification information of the second communication channel which is different from the first communication channel in the target channel information.

4. The electronic apparatus as claimed in claim 1, wherein the second communication channel belongs to a band which is different from the first communication channel.

5. The electronic apparatus as claimed in claim 1, where when the at least one terminal device accesses the second communication channel based on the second identification information, a communication which is being performed through the first communication channel between the relay device and the at least one terminal device is blocked.

6. The electronic apparatus as claimed in claim 1, wherein the wireless communication between the relay device and the at least one terminal device is performed according to a standard of IEEE 802.11w.

7. The electronic apparatus as claimed in claim 1, wherein the electronic apparatus is implemented as a Wireless Intrusion Prevention System (WIPS) device.

8. A controlling method of an electronic apparatus, the method comprising:
based on a wireless communication between a relay device and at least one terminal device being sensed by a sensor, identifying whether the relay device and the terminal device is an authorized device;
generating a beacon signal by including identification information of the relay device as source information, the beacon signal being generating by including identification information of the at least one terminal device as destination information based on the at least one terminal device being identified as an unauthorized device;
based on the at least one terminal device being identified as an unauthorized device, transmitting the beacon signal including communication channel transfer information to the at least one terminal device;
based on the relay device being identified as an unauthorized device, broadcasting the beacon signal including communication channel transfer information,
wherein the identification information of each of the relay device and the at least one terminal device includes at least one of the MAC address information of each of the relay device and the at least one terminal device, security settings information, frame appearance frequency information, transmission rate information, data size information, communication channel, RSSI (Received Signal Strength Indicator) information.

9. The controlling method as claimed in claim 8, wherein the communication channel transfer information includes control information to control channel transfer and channel information including target channel information, wherein the control information includes information for instructing a transfer from a first communication channel, and wherein the target channel information includes information for transferring from the first communication channel to a second communication channel.

10. The controlling method as claimed in claim 9, further comprising:
based on first identification information of the first communication channel through which the wireless communication between the relay device and the at least one terminal device is performed being acquired by the sensor, generating the beacon signal by including second identification information of the second communication channel which is different from the first communication channel in the target channel information.

11. The controlling method as claimed in claim 10, wherein the second communication channel belongs to a band which is different from the first communication channel.

12. The controlling method as claimed in claim 10, where when the at least one terminal device accesses the second communication channel based on the second identification information, a communication which is being performed through the first communication channel between the relay device and the at least one terminal device is blocked.

13. The controlling method as claimed in claim 8, wherein the wireless communication between the relay device and the at least one terminal device is performed according to a standard of IEEE 802.11w.

14. The controlling method as claimed in claim 8, wherein the electronic apparatus is implemented as a Wireless Intrusion Prevention System (WIPS) device.

15. A non-transitory computer readable recording medium storing a computer instruction to perform an operation of an electronic apparatus when executed by a processor, the operation comprising:
based on a wireless communication between a relay device and at least one device being sensed by the sensor, identifying whether the relay device and the at least one terminal device is an authorized device;
generating a beacon signal by including identification information of the relay device as source information, the beacon signal being generated by including identification information of the at least one terminal device as destination information based on the at least one terminal device being identified as an unauthorized device;
based in the at least one terminal device being identified as an unauthorized device, transmitting the beacon signal including communication channel transfer information to the terminal device;
based on the relay device being identified as an unauthorized device, broadcasting the beacon signal including communication channel transfer information;
wherein the identification information of each of the relay device and the at least one terminal device includes at least one of the MAC address information of each of the relay device and the at least one terminal device, security settings information, frame appearance frequency information, transmission rate information, data size information, communication channel, RSSI (Received Signal Strength Indicator) information.

* * * * *